(12) United States Patent
Sato et al.

(10) Patent No.: US 7,874,278 B2
(45) Date of Patent: Jan. 25, 2011

(54) INTAKE PORT OF INTERNAL COMBUSTION ENGINE

(75) Inventors: Yasuo Sato, Susono (JP); Osamu Horikoshi, Susono (JP); Noriyuki Takada, Susono (JP); Masanobu Nishiwaki, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 506 days.

(21) Appl. No.: 11/991,472

(22) PCT Filed: Jan. 25, 2007

(86) PCT No.: PCT/JP2007/051650

§ 371 (c)(1),
(2), (4) Date: Mar. 5, 2008

(87) PCT Pub. No.: WO2007/086596

PCT Pub. Date: Aug. 2, 2007

(65) Prior Publication Data

US 2009/0120399 A1    May 14, 2009

(30) Foreign Application Priority Data

Jan. 27, 2006    (JP) .............................. 2006-019118

(51) Int. Cl.
*F02B 31/08*    (2006.01)
(52) U.S. Cl. ...................... 123/308; 123/432
(58) Field of Classification Search ............... 123/306, 123/308, 432
See application file for complete search history.

(56) References Cited

U.S. PATENT DOCUMENTS

| | | | | |
|---|---|---|---|---|
| 4,466,398 A | * | 8/1984 | Nakanishi et al. | 123/188.14 |
| 5,479,889 A | * | 1/1996 | Sato et al. | 123/308 |
| 5,884,598 A | | 3/1999 | Kawashima | |
| 6,250,281 B1 | * | 6/2001 | Takii et al. | 123/308 |
| 6,655,347 B2 | * | 12/2003 | Takamiya et al. | 123/306 |
| 7,707,989 B2 | * | 5/2010 | Andou et al. | 123/306 |
| 2002/0112693 A1 | * | 8/2002 | Stutz et al. | 123/308 |
| 2009/0301432 A1 | * | 12/2009 | Fritz et al. | 123/306 |

FOREIGN PATENT DOCUMENTS

| | | |
|---|---|---|
| JP | 55-046001 A | 3/1980 |
| JP | 63-4335 | 1/1988 |
| JP | 2-147830 | 12/1990 |
| JP | 05-248249 | 9/1993 |
| JP | 06-017658 A | 1/1994 |
| JP | 10-89078 | 4/1998 |

\* cited by examiner

*Primary Examiner*—Erick Solis
(74) *Attorney, Agent, or Firm*—Kenyon & Kenyon LLP

(57) ABSTRACT

An internal combustion engine wherein the top wall surface of the intake air inflow passage part of the intake port is formed by a first top wall surface and a second top wall surface lower than the first top wall surface and wherein a lower layer flow passage and an upper layer flow passage are formed at the height position of the second top wall surface as a boundary. When the intake valve opens, a lower layer flow flowing through the inside of the lower layer flow passage passes through the intake valve opening region, flows to the circumferential direction of the combustion chamber, and generates a swirl, while an upper layer flow flowing through the inside of the upper layer flow passage passes through the helical part and flows into the combustion chamber.

4 Claims, 3 Drawing Sheets

(A)  (B)  (C)

(A)          (B)

INTAKE PORT OF INTERNAL COMBUSTION ENGINE

This is a 371 national phase application of PCT/JP2007/051650 filed 25 Jan. 2007, claiming priority to Japanese Patent Applicaion No. 2006-019118 filed 27 Jan. 2006, the contents of which are incorporated herein by reference.

TECHNICAL FIELD

The present invention relates to an intake port of an internal combustion engine.

BACKGROUND ART

Known in the art is a helical type intake port comprised of a helical part formed about the axis of the intake valve and an intake air inflow passage part extending tangentially from the helical part, the intake air inflow passage part having a first side wall surface tangentially connected to the peripheral wall surface of the helical part and a second side wall surface extending toward the stem of the intake valve up to the peripheral wall surface of the helical part, wherein the top wall surface of the intake air inflow passage part is comprised of a first top wall surface positioned at the above-mentioned first side wall surface side and smoothly connected to the top wall surface of the helical part and a second top wall surface positioned at the above-mentioned second side wall surface side and lower in height than the first top wall surface, a lower layer flow flowing along the bottom wall surface of the intake air inflow passage part and an upper layer flow flowing along the first top wall surface are generated at a height position of this second top wall surface as a boundary, and this upper layer flow generates a swirl in the combustion chamber (see Japanese Utility Model Publication (A) No. 2-147830).

In this helical type intake port, when the intake air amount is large, the whirling action of the upper layer flow in the helical part is weakened by the lower layer flow and thereby generation of excessive swirl in the engine high operation region is prevented.

However, in this helical type intake port, in the same way as a conventional helical type intake port, a swirl is generated in the combustion chamber by making intake air to swirl in the helical part. In this case, to strengthen the swirl, it is necessary to strengthen the whirling action in the helical part. However, if strengthening the whirling action in the helical part, the intake resistance increases, so the charging efficiency falls and as a result the output at the time of maximum load operation falls.

In this way, so long as strengthening the whirling action in the helical part to strengthen the swirl, it is difficult to simultaneously secure a powerful swirl and high charging efficiency. To simultaneously secure a powerful swirl and high charging efficiency, a complete switch in thinking is necessary.

The inventors researched the method of flow of intake air for a long time up to this and finally discovered an intake port enabling a powerful swirl and high charging efficiency to be simultaneously secured.

DISCLOSURE OF THE INVENTION

Therefore, an object of the present invention is to provide an intake port of an internal combustion engine able to simultaneously secure a powerful swirl and a high charging efficiency.

According to the present invention, there is provided an intake port of an internal combustion engine comprised of a helical part formed about an axis of an intake valve and an intake air inflow passage part extending tangentially from the helical part, the helical part being defined by a peripheral wall surface extending about the axis of the intake valve, a top wall surface, and a bottom end outlet opened and closed by the intake valve, the intake air inflow passage part being defined by a first side wall surface tangentially connected to the peripheral wall surface of the helical part, a second side wall surface extending toward a stem of the intake valve until the peripheral wall surface of the helical part, a top wall surface, and a bottom wall surface, wherein the bottom end outlet of the helical part is arranged at a peripheral portion of a combustion chamber top surface, the intake air inflow passage part is arranged so that the first side wall surface extends tangentially with respect to the peripheral portion of the combustion chamber, in a ring shaped intake valve opening formed between the intake valve and a seat of the intake valve when the intake valve is fully open, there is an intake valve opening region formed at an opposite side of the intake air inflow passage part with respect to a plane including a cylinder axis and a central portion of an intake valve body, a lower layer flow flowing through a lower part of the intake air inflow passage part and an upper layer flow flowing through an upper part of the intake air inflow passage part are generated in the intake air inflow passage part, the lower layer flow flows toward the intake valve opening region, then flows from the intake valve opening region to an inside of the combustion chamber toward the circumferential direction of the combustion chamber to generate a swirl in the combustion chamber when the intake valve is opened, and the upper layer flow whirls in the helical part and then flows, while diffusing, from the entirety of the intake valve opening into the combustion chamber when the intake valve is opened.

BEST MODE FOR CARRYING OUT THE INVENTION

Figure 1:
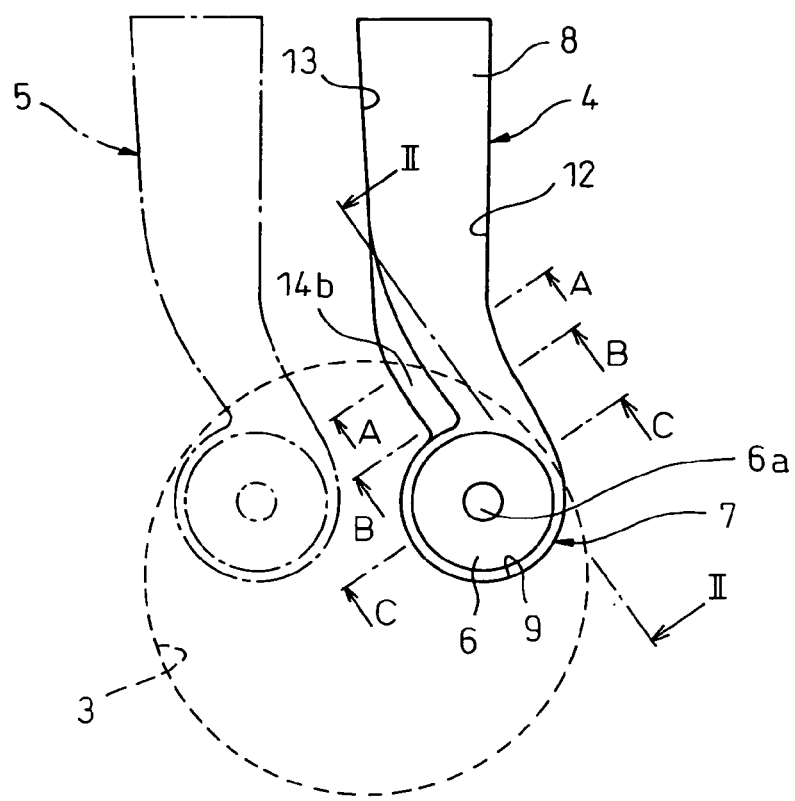
FIG. 1 is a plan view of intake ports.
Figure 2:
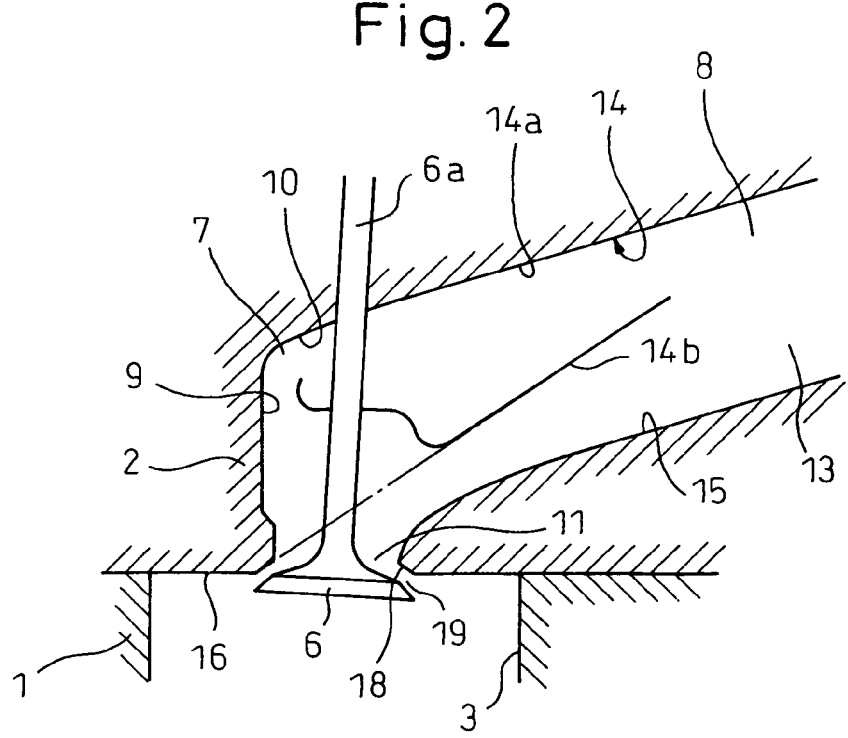
FIG. 2 is a sectional view of an intake port seen along the line II-II of FIG. 1, FIG. 3 are sectional views of the intake port shown in FIG. 1, where (A), (B), and (C) are sectional views as seen along the line A-A, line B-B, and line C-C of FIG. 1.
Figure 3:
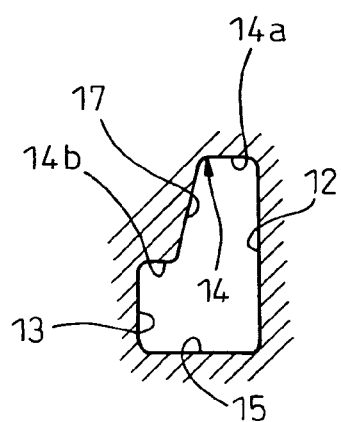
Figure 3:
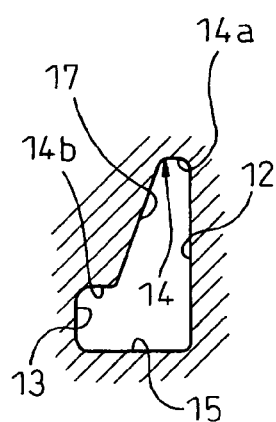
Figure 3:
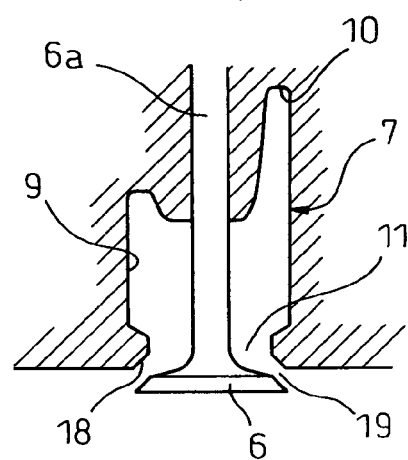

Referring to FIG. 1 to FIG. 3, 1 indicates a cylinder block, 2 a cylinder head, and 3 a combustion chamber. In the embodiment shown in FIG. 1, inside the cylinder head 2 is formed a pair of intake ports 4 and 5. Further, while not shown in FIG. 1, inside the cylinder head 2 is formed a pair of exhaust ports. The present invention relates to the intake port 4 shown by the solid line in FIG. 1 among the pair of intake ports 4 and 5. Therefore, below, only this intake port 4 will be explained.

Referring to FIG. 1 to FIG. 3, the intake port 4 is comprised of a helical part 7 formed about the axis of the intake valve 6 and an intake air inflow passage part 8 extending tangentially from this helical part 7. As shown in FIG. 1, FIG. 2, and FIG. 3(C), the helical part 7 is defined by a peripheral wall surface 9 extending about the axis of the intake valve 6, a top wall surface 10, and a bottom end outlet 11 opened and closed by the intake valve 6. As shown in FIG. 1 and FIG. 2, the intake air inflow passage part 8 is defined by a first side wall surface 12 connected tangentially to the peripheral wall surface 9 of the helical part 7, a second side wall surface 13 extending toward a stem 6a of the intake valve 6 up to the peripheral wall surface 9 of the helical part 7, a top wall surface 14, and a bottom wall surface 15.

As will be understood from FIG. 1, the bottom end outlet 11 of the helical part 7 (FIG. 2) is arranged at the peripheral portion of the top surface 16 of the combustion chamber 3 (FIG. 2). The intake air inflow passage part 8 is arranged so that the first side wall surface 12 extends tangentially with respect to the peripheral portion of the combustion chamber 3. That is, as shown in FIG. 1, the downstream side of the intake air inflow passage part 8 extends tangentially with respect to the peripheral portion of the combustion chamber 3, while the upstream side of the intake air inflow passage part 8 is bent somewhat in a direction away from the combustion chamber 3 with respect to the downstream side of the intake air inflow passage part 8 due to layout reasons.

Figure 5:
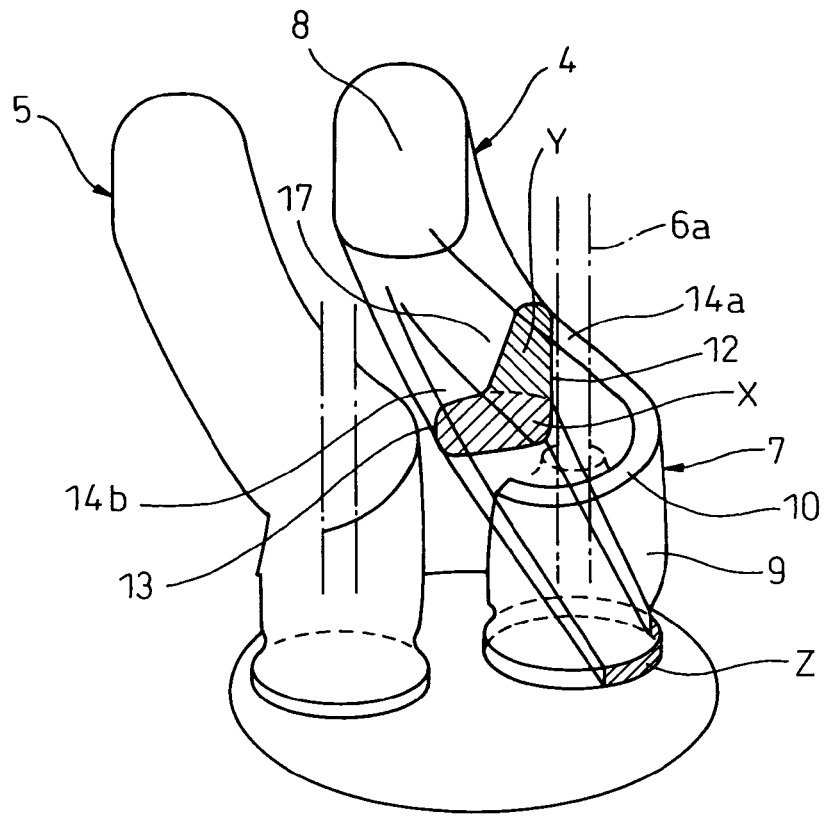
FIG. 5 is a perspective view of intake ports shown schematically, and FIG. 6 are views showing a lower layer flow passage X and upper layer flow passage Y.

FIG. 5 is a perspective view schematically showing the intake port 4. Referring to FIG. 1 to FIG. 3 and FIG. 5, the top wall surface 14 of the intake air inflow passage part 8 is comprised of, at least at a downstream side of the intake air inflow passage part 8, a first top wall surface 14a positioned at the first side wall surface 12 side and smoothly connected to the top wall surface 10 of the helical part 7 and a second top wall surface 14b positioned at the second side wall surface 13 side and positioned more to the bottom wall surface 15 side than the first top wall surface 14a. The cross-sectional shape of the intake air inflow passage part 8 part where the second top wall surface 14b is formed at a lower position with respect to the first top wall surface 14a is shown by hatching in FIG. 5.

As will be understood from FIGS. 3(A) to 3(C) and FIG. 5, the first top wall surface 14a descends toward the helical part 7 while gradually narrowing in horizontal width, then, as explained above, is smoothly connected to the top wall surface 10 of the helical part 7. The top wall surface 10 of this helical part 7 gradually descends along the peripheral portion of the helical part 7 and extends over about ¾ of the entire circumference of the helical part 7. On the other hand, the second top wall surface 14b is fixed in width, at the downstream side of the intake air inflow passage part 8, to about ⅓ of the width of the bottom wall surface 15 and gradually is reduced in width, at the upstream side of the intake air inflow passage part 8, the more toward the upstream side.

On the other hand, as shown in FIGS. 3(A) to (C) and FIG. 5, the first top wall surface 14a and second top wall surface 14b extend in substantially parallel directions in the horizontal cross-section of the intake air inflow passage part 8. The wall surface 17 positioned between the first top wall surface 14a and the second top wall surface 14b is comprised of a downward oriented inclined surface. This inclined surface 17 gradually increases in width toward the helical part 7. On the other hand, as shown in FIG. 2, the second top wall surface 14b also descends toward the helical part 7. In this case, the angle of inclination of the second top wall surface 14b is larger than the angle of inclination of the first top wall surface 14a.

Figure 6:
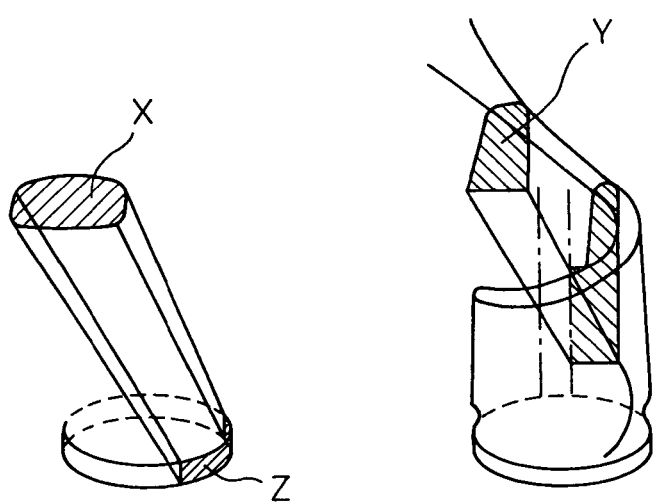

If forming the first top wall surface 14a and the second top wall surface 14b in stepped shapes in this way, inside the intake air inflow passage part 8, there are formed a lower layer flow passage defined by a lower part of the first side wall surface 12, a second side wall surface 13, a second top wall surface 14b, and a bottom wall surface 15 as shown by the hatching X in FIG. 5 and an upper layer flow passage above the lower layer flow passage and positioned between the lower layer flow passage and first top wall surface 14a as shown by the hatching Y. That is, inside the intake air inflow passage part 8, two flows, that is, a lower layer flow flowing through the inside of the lower layer flow passage X and an upper layer flow flowing through the inside of the upper layer flow passage Y, are generated. FIG. 6(A) shows the case taking out only the parts relating to the lower layer flow passage X of FIG. 5, while FIG. 6(B) shows the case taking out only the parts relating to the upper layer flow passage Y of FIG. 5.

Figure 4:
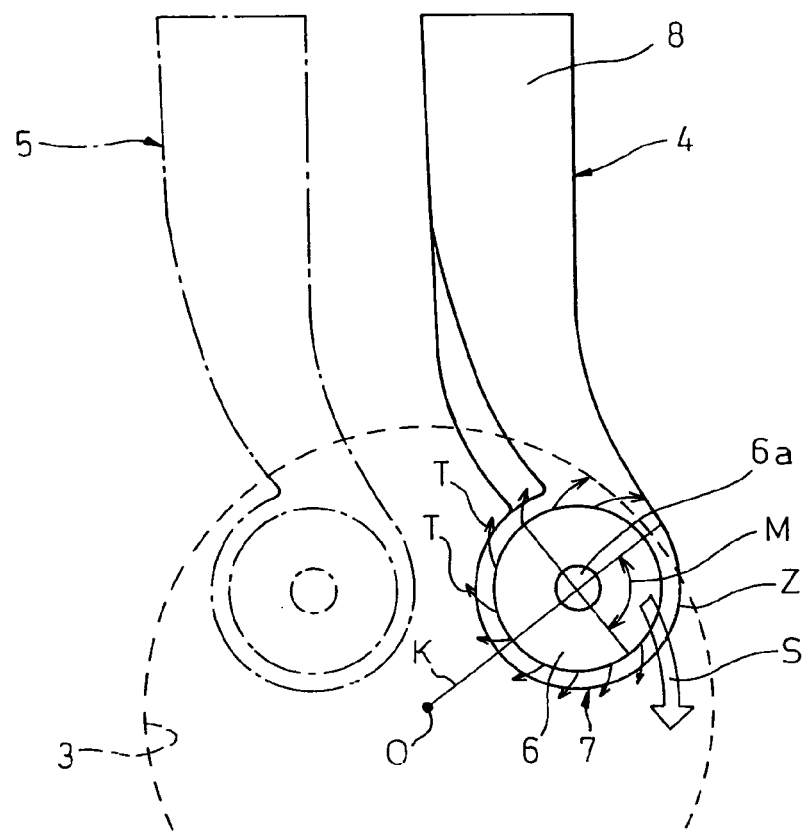
FIG. 4 is an enlarged view of FIG. 1.

FIG. 4 is an enlarged view of FIG. 1. As shown in FIG. 2 and FIG. 3(C), if the intake valve 6 opens, a ring-shaped intake valve opening 19 is formed between the intake valve 6 and the seat 18 of the intake valve 6. In this case, in the ring shaped intake valve opening 19 formed between the intake valve 6 and the seat 18 of the intake valve 6 when the intake valve 6 fully opens, there is an intake valve opening region formed at an opposite side of the intake air inflow passage part 8 with respect to a plane K including the cylinder axis O and the central portion of the body of the intake valve 6 in FIG. 4. This intake valve opening region is shown by Z in FIG. 4, FIG. 5, and FIG. 6(A).

This intake valve opening region Z is a range of about 90 degrees from the intersecting portion of the plane K and the intake valve opening 19 of the combustion chamber 3 peripheral edge side in FIG. 4 to the whirling direction of the flow of intake air in the helical part 7. In the present invention, as will be understood from FIG. 5 and FIG. 6(A), the lower part of the first side wall surface 12, the second side wall surface 13, the second top wall surface 14b, and the bottom wall surface 15 are formed so that the lower layer flow passage X extends straight toward the intake valve opening region Z.

The second top wall surface 14b, as shown in FIG. 2, extends toward the top end edge of the intake valve opening 19 positioned at the opposite side of the second top wall surface 14b with respect to the plane K so that the lower layer flow passage X extends straight toward the intake valve opening region Z. If forming the lower layer flow passage X in this way, when the intake valve 6 opens, the lower layer flow flowing through the inside of the lower layer flow passage X proceeds straight inside the lower layer flow passage X, then, as shown by the arrow S in FIG. 4 and flows from the intake valve opening region Z toward the circumferential direction of the combustion chamber 3 in the combustion chamber 3, whereby a powerful swirl around the cylinder axis O is generated in the combustion chamber 3.

On the other hand, when the intake valve 6 opens, the upper layer flow flowing through the upper layer flow passage Y proceeds inside the upper layer flow passage Y, then whirls inside the helical part 7 and, as shown by the arrow T in FIG. 4, flows, while diffusing, from the entirety of the intake valve opening 19 into the combustion chamber 3. In this way, by making the intake air flow from the entirety of the intake valve opening 19, it is possible to increase the intake air amount. That is, if making the upper layer flow flow into the combustion chamber 3 without making it whirl, the majority of the upper layer flow flows into the combustion chamber 3 from only the intake valve opening at the opposite side to the intake air inflow passage part 8. This is substantially the same as the intake valve opening becoming smaller in passage area, therefore an increase in intake air amount cannot be expected.

As opposed to this, if giving a whirling flow to the upper layer flow in the helical part 7, the upper layer flow, as explained above, disperses from the entirety of the intake valve opening 19 and flows into the combustion chamber 3. This is the same as the intake valve opening 19 becoming larger in passage area, therefore the intake air amount increases and the charging efficiency is improved. In this way, in the present invention, a whirling flow is generated in the helical part 7 to improve the charging efficiency and not to generate a swirl like in the past.

On the other hand, if making the intake air whirl in the helical part 7 while flowing into the combustion chamber 3, it appears as if the whirling flow of intake air as a whole shifts as it is to the swirl flow. However, what contributes to the generation of the swirl is the part of the flow of intake air heading toward the circumferential direction of the combustion chamber in the whirling flow of intake air, therefore even if making the intake air whirl while flowing into the combustion chamber 3, in actuality only part of the intake air contributes to the generation of the swirl. That is, to generate a swirl, generating a powerful flow of intake air heading toward the circumferential direction of the combustion chamber 3 as in the present invention is the most effective.

In this way, in the present invention, the lower layer flow flowing straight from the inside of the intake port 4 to the inside of the combustion chamber 3 toward the circumferential direction of the combustion chamber 3 is used to generate a powerful swirl inside the combustion chamber 3, and by the upper layer flow whirling inside the helical part 7, then flowing into the combustion chamber 3, the amount of intake air is increased. Thereby a high charging efficiency is achieved and a powerful swirl can be generated.

LIST OF REFERENCE NUMERALS

3 . . . combustion chamber
4,5 . . . intake port
6 . . . intake valve
7 . . . helical part
8 . . . intake air inflow passage part
9 . . . peripheral wall surface
10 . . . top wall surface
11 . . . bottom end outlet
12 . . . first side wall surface
13 . . . second side wall surface
14a . . . first top wall surface
14b . . . second top wall surface
15 . . . bottom wall surface
18 . . . seat
19 . . . intake valve opening
X . . . upper layer flow passage
Y . . . lower layer flow passage
Z . . . intake valve opening region

The invention claimed is:

1. An intake port of an internal combustion engine comprised of a helical part formed about an axis of an intake valve and an intake air inflow passage part extending tangentially from said helical part, said helical part being defined by a peripheral wall surface extending about the axis of the intake valve, a top wall surface, and a bottom end outlet opened and closed by the intake valve, said intake air inflow passage part being defined by a first side wall surface tangentially connected to the peripheral wall surface of the helical part, a second side wall surface extending toward a stem of the intake valve until the peripheral wall surface of the helical part, a top wall surface, and a bottom wall surface, wherein the bottom end outlet of said helical part is arranged at a peripheral portion of a combustion chamber top surface, the intake air inflow passage part is arranged so that said first side wall surface extends tangentially with respect to the peripheral portion of the combustion chamber, in a ring shaped intake valve opening formed between the intake valve and a seat of the intake valve when the intake valve is fully open, there is an intake valve opening region formed at an opposite side of the intake air inflow passage part with respect to a plane including a cylinder axis and a central portion of an intake valve body, a lower layer flow flowing through a lower part of the intake air inflow passage part and an upper layer flow flowing through an upper part of the intake air inflow passage part are generated in the intake air inflow passage part, said lower layer flow flows toward said intake valve opening region, then flows from the intake valve opening region to an inside of the combustion chamber toward the circumferential direction of the combustion chamber to generate a swirl in the combustion chamber when the intake valve is opened, and said upper layer flow whirls in the helical part and then flows, while diffusing, from the entirety of the intake valve opening into the combustion chamber when the intake valve is opened.

2. An intake port of an internal combustion engine as set forth in claim 1, wherein the top wall surface of the intake air inflow passage part is comprised of, at least at the downstream side of the intake air inflow passage part, a first top wall surface positioned at the first side wall surface side and smoothly connected to the top wall surface of the helical part and a second top wall surface positioned at the second side wall surface side and positioned more at the bottom wall surface side than said first top wall surface, a lower layer flow passage through which the lower layer flow flows is defined by a lower part of the first side wall surface, the second side wall surface, the second top wall surface, and the bottom wall surface, an upper layer flow passage through which the upper layer flow flows is formed above the lower layer flow passage and between the lower layer flow passage and the first top wall surface, and the lower part of the first side wall surface, the second side wall surface, the second top wall surface, and the bottom wall surface are formed so that said lower layer flow passage extends straight toward said intake valve opening region.

3. An intake port of an internal combustion engine as set forth in claim 1, wherein said intake valve opening region is a range of about 90 degrees from the intersecting portion of said plane and the intake valve opening of the combustion chamber peripheral edge side to a whirling direction of the flow of intake air in the helical part.

4. An intake port of an internal combustion engine as set forth in claim 1, wherein said second top wall surface extends toward a top end edge of the intake valve opening positioned at the opposite side of said second top wall surface with respect to said plane.

* * * * *